United States Patent Office 2,865,345
Patented Dec. 23, 1958

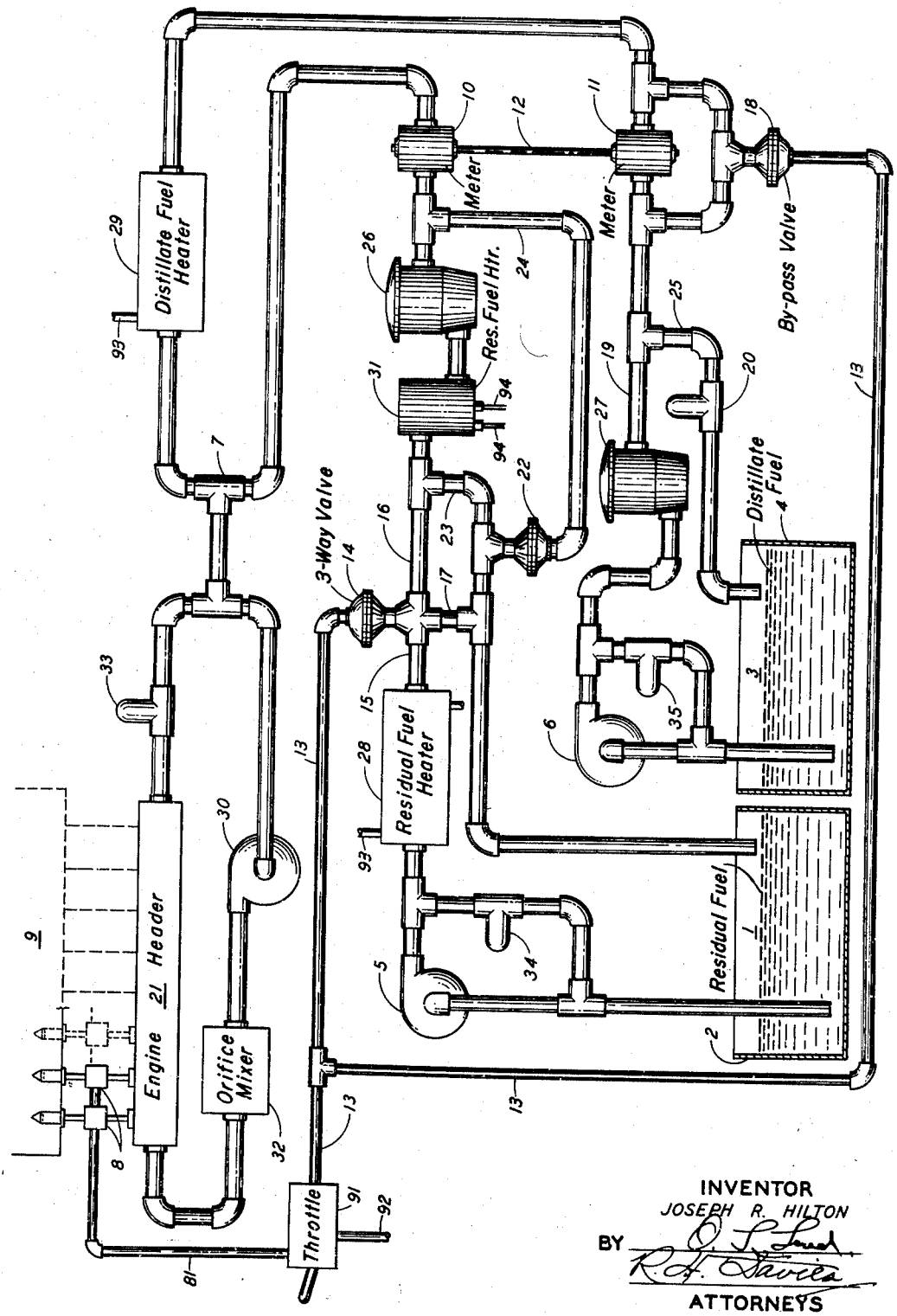

2,865,345

FLUID FLOW PROPORTIONING

Joseph R. Hilton, Concord, Calif., assignor, by mesne assignments, to California Research Corporation, San Francisco, Calif., a corporation of Delaware Application November 2, 1955, Serial No. 544,500

1 Claim. (Cl. 123—30)

This invention relates to automatic fluid flow control, and more particularly to maintaining a substantially constant ratio between the fluid flow rates in a plurality of separate fluid streams; and an object of the invention is to provide apparatus for maintaining a predeterminable ratio between the flow rates in a plurality of separate fluid streams which is operable on energy from the fluid streams only and which will permit variations in the sum of the flow rates of the several streams.

In many industrial applications it is desirable to charge a plurality of fluids to particular zones in varying total quantities per unit time, but at substantially constant relative rates. For example, in simultaneously supplying a plurality of dissimilar fuels to a compression ignition internal combustion engine, it may be found desirable to maintain a fixed ratio between the rates at which the engine utilizes the various fuels, irrespective of how the total fuel consumption rate varies with engine load and speed. If the total fuel consumption rate were a constant, a fixed ratio between the separate fuel flow rates could be satisfactorily accomplished by conventional methods and devices, such as valves or orifice plates. However, when either flow rate or both rates are subject to change in a manner which tends to vary the ratio between those rates, maintenance of fixed flow rate ratios is a much more difficult problem. To solve this problem, various valves, pressure-responsive devices, orifice plates and other means have been suggested, but these means leave much to be desired in the way of simple and efficient flow proportioning. If such flow proportioning can be accompanied by positive displacement means, operable on energy from the fluid streams and that does not require other energy sources or external manipulation, prior disadvantages can be overcome.

It is an object of the present invention to provide apparatus for maintaining a predeterminable ratio between the flow rates in a plurality of separate fluid streams tending to flow at variable rates.

It is a further object of this invention to provide such apparatus that will obtain its total operating energy requirements from the associated flowing fluid streams.

In accordance with the present invention simple, effective and efficient flow proportioning for a plurality of fluid streams tending to flow at variable rates is provided by positive displacement means in each fluid stream and a mechanical coupling between said means to maintain a fixed ratio between the operating speeds thereof.

The novel features of the present invention are set forth with particularity in the appended claim. The invention will best be understood, however, both as to organization and operation, and additional objects and advantages thereof will be apparent, from the following description of a specific embodiment, when read in connection with the accompanying drawing, in which the single figure is a schematic diagram of the invention as incorporated in a duel fuel system on a compression ignition internal combustion engine.

Referring now to the drawing, residual fuel 1 is pumped from residual fuel tank 2 and distillate fuel 3 is pumped from distillate fuel tank 4 by fuel transfer pumps 5 and 6, respectively, to mixing T 7 and thence as a fuel mixture to fuel injectors 8 of engine 9, said injectors being controlled pneumatically through conduit 81 by throttle 91.

Device 10 in the residual fuel line is a positive displacement means operable by the flow of residual fuel 1, and may be, for example, rotating gate means or vane-type fluid motor. Device 11 is similar to device 10, and is located in the distillate fuel line. Coupling 12 is a mechanical coupling between devices 10 and 11, and may be, for example, a direct shaft coupling to maintain a 1:1 ratio between the speed of rotation of devices 10 and 11. Alternatively, coupling 12 may include gearing means to maintain a fixed ratio other than 1:1 between the speeds of rotation of devices 10 and 11. Devices 10 and 11 have no external connections except coupling 12, and in the absence of coupling 12 each would "float" on its respective fuel line and rotate solely in response to fuel flow therethrough, thus acting as an unrestrained flow meter. The term meter is used here in the sense of means for measurably or accurately controlling the flow of fuel rather than in the sense of means for indicating its flow rate in specific units of quantity per unit time. Accordingly, in this specification and claim the term meter will be used hereinafter to identify the meter devices designated 10 and 11, as well as to specify their function in the fuel controlling systems. Therefore, with coupling 12 between meters 10 and 11, the rotation of each of those meters in its respective fluid stream is the result of the combined effects of that fluid stream and of the other stream acting through coupling 12. These combined effects can be such that either fluid stream exerts the predominant driving force for coupled meters 10 and 11, thus imparting a twisting moment to coupling 12 and placing it under torsion, or both fluid streams can exert substantial driving force, thus decreasing or neutralizing the torsion on coupling 12. However, regardless of the source or sources of the driving force for meters 10 and 11, they will maintain the same relative speed because of coupling 12, and will thus maintain the same volumetric flow ratio between the two fluid streams.

Still referring to the drawing, in the preferred embodiment shown it is preferable that the heavier residual fuel 1 should be the predominant driving force for coupled meters 10 and 11. The reason is that in this way the pressure drop is minimized across meter 11 in the stream of the lighter distillate fuel 3, and therefore the greater tendency of the lighter distillate fuel 3 to leak through meter 11 without regard to the rotation thereof is minimized.

The complete operation of the fuel system shown in the drawing is as follows: Air line 13 is connected to the throttle 91 of diesel engine 9 which is connected to any suitable source of compressed air through supply conduit 92. At throttle positions associated with lower speeds of diesel engine 9, the air pressure in air line 13 is such that 3-way pneumatic valve 14 prevents flow of residual fuel 1 from line 15 to line 16, but causes residual fuel 1 flowing in line 15 to return to residual fuel tank 2 through line 17. At the same throttle positions and line 13 air pressure, pneumatic by-pass valve 18 is open, and permits flow of distillate fuel 3 in line 19 to travel through valve 18, thus by-passing fluid meter 11. At lower throttle positions engine 9 thus operates on distillate fuel 3 only, and coupled ratioing meters 10 and 11 are inoperative because there are not two fuel streams being supplied to engine 9 for meters 10 and 11 to maintain a flow ratio between. With transfer pump 6 pumping distillate fuel 3 at at least the minimum rate at which engine 9 will require distillate fuel, either alone or with residual fuel, for example, 125 gallons per hour for a 1500 H. P. diesel railroad locomotive, transfer pump 5 is adjusted to pump residual fuel 1 at a desired rate. The desired residual fuel rate will depend upon the distillate fuel rate necessary for a particular engine, and upon the desired coupling or gearing ratio between meters 10 and 11. In any event, as hereinbefore pointed out, desirably residual fuel 1 is pumped at a rate sufficient that residual fuel 1 entering meter 10 acts as the predominant driving force on coupled meters 10 and 11. With distillate fuel 3 and residual fuel 1 being pumped at the desired rates, and with all residual fuel being returned to residual fuel tank 2 through line 17, and with pressure relief valve 20 adjusted to return to distillate fuel tank 4 all distillate fuel 3 being pumped in excess of the needs of engine 9, the fuel system shown is ready for the fuel blending and fuel ratioing phase of its operation.

As the throttle 91 of engine 9 is moved to higher load and speed positions, the change in air pressure in line 13 causes 3-way pneumatic valve 14 to close line 17 and permit residual fuel 1 to flow through line 16 to meter 10. At the same time, the change in air pressure in line 13 causes pneumatic by-pass valve 18 to close and prevent any distillate fuel from being by-passed around meter 11. Residual fuel 1 and distillate fuel 3 are thus forced through meters 10 and 11, respectively, and are mixed at and beyond mixing T 7 in a ratio governed by the relative capacities of meters 10 and 11 and by the presence or absence of a gearing arrangement in connection with coupling 12. With engine 9 thus operating on a mixture of predetermined proportions of residual fuel 1 and distillate fuel 3, the pressure in engine header 21 will limit the rate at which header 21 accepts the fuel mixture. Therefore, back pressure controller 22 is set to permit residual fuel flowing in line 16 in excess of the amount necessary for the fuel mixture to return to residual fuel tank 2 through line 23. This result is accomplished by the action of the residual fuel pressure in line 24 on a diaphragm in back pressure controller 22. Similarly, pressure relief valve 20 is set to permit distillate fuel flowing in line 19 in excess of the amount necessary for the fuel mixture to return through line 25 to distillate fuel tank 4.

Filters 26 and 27 are conventional fuel filters, and residual and distillate fuel heaters 28 and 29 may be, for example, hot water heaters supplied with continuously circulating hot water through lines 93 from the hot water jacket of engine 9. Residual fuel heater 31 may be, for example, an electric heater energized from a low voltage source connected to terminals 94. Circulating pump 30 maintains the fuel mixture in fuel header 21 in a continuous state of circulation through the closed loop circulating system comprising fuel header 21 and orifice mixer 32 to counteract fuel incompatibility and maintain fuel mixture uniformity, as described in more detail in the copending application of Primo L. Pinotti, Dual Fuel System for Compression Ignition Engines," Serial No. 516,071, filed June 17, 1955 which issued August 14, 1956, as Patent 2,758,579, and was assigned to the assignee of the present invention. Pressure relief valve 33 may be provided, if desired, to maintain a desired pressure in fuel header 21, against the action of circulating pump 30. Pressure relief valves 34 and 35 may be provided to open at a desired value to protect pumps 5 and 6, respectively, against overload.

From the foregoing it may be seen that the present invention operates in a novel and effective manner to maintain a constant predeterminable proportion between the flow rates of two fluids flowing at variable rates in two separate fluid streams, irrespective of the combined flow rate of the two streams. It may also be seen that the invention is especially useful in preparing mixtures of two fluids, for example, two dissimilar fuels, when the individual flow rates of the two fuels are subject to variation and when it is desired that the resulting mixture have constant proportions.

Although only specific arrangements and modes of construction and operation of the present invention have been described and illustrated, numerous changes could be made in those arrangements and modes without departing from the spirit of the invention, for example, the invention could be applied to simultaneous proportioning of the flow rates of more than two fluids by providing additional fluid streams and coupled fluid pumps. All such changes that fall within the scope of the appended claim are intended to be embraced thereby.

I claim:

For use with a circulating header for supplying dissimilar fuels to a compression ignition engine having a throttle, selectively operated means for maintaining a predetermined ratio of said fuels at high load conditions and for supplying only distillate fuel at low load conditions, said means comprising a residual fuel line, a valve in said line, a distillate fuel line, a positive displacement meter of the rotating type in each of said lines, and means coupling the rotating parts of said meters, a bypass around the meter in said distillate line, a valve in said bypass, means for opening said valve in said bypass and for closing the valve in said residual fuel line and meter at low load conditions to supply only distillate fuel to said header, and means for rendering said last-named means inoperative at high load conditions whereby said residual fuel meter will be operative through said coupling means to control the rate of flow of distillate through said distillate meter to said header at a predetermined ratio to the residual fuel flow.

References Cited in the file of this patent

UNITED STATES PATENTS

| 1,926,333 | Fulcher | Sept. 12, 1933 |
| 1,961,350 | Grunsky | June 5, 1934 |
| 2,195,005 | Grosvenor et al. | Mar. 26, 1940 |